United States Patent

Mansur et al.

(10) Patent No.: US 6,549,978 B2
(45) Date of Patent: Apr. 15, 2003

(54) METHOD FOR STORAGE CONTROLLERS WITH DIFFERENT DATA FORMATS TO ACCESS COMMON STORAGE CONFIGURATION INFORMATION

(75) Inventors: Al Mansur, Westminster, CO (US); Joseph G. Skazinski, Berthoud, CO (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 09/764,784

(22) Filed: Jan. 17, 2001

(65) Prior Publication Data

US 2002/0095548 A1 Jul. 18, 2002

(51) Int. Cl.$^7$ .............................................. G06F 13/00
(52) U.S. Cl. ........................ 711/114; 711/112; 711/4; 711/170; 710/8; 713/1
(58) Field of Search ................... 710/8, 9, 10; 707/100; 713/1, 100; 711/114, 112, 4, 170

(56) References Cited

U.S. PATENT DOCUMENTS

| | | | |
|---|---|---|---|
| 5,479,653 A | 12/1995 | Jones | 395/182.03 |
| 5,574,851 A | 11/1996 | Rathunde | 395/182.05 |
| 5,615,352 A | 3/1997 | Jacobson et al. | 395/441 |
| 5,696,934 A | 12/1997 | Jacobson et al. | 395/441 |
| 5,748,980 A * | 5/1998 | Lipe et al. | 710/104 |
| 5,787,246 A * | 7/1998 | Lichtman et al. | 709/220 |
| 5,822,782 A * | 10/1998 | Humlicek et al. | 711/114 |
| 5,854,942 A | 12/1998 | Penokie | 395/830 |
| 5,867,736 A * | 2/1999 | Jantz | 710/74 |
| 5,890,204 A | 3/1999 | Ofer et al. | 711/111 |
| 5,940,849 A * | 8/1999 | Koyama | 360/48 |
| 5,950,230 A | 9/1999 | Islam et al. | 711/156 |
| 5,960,169 A | 9/1999 | Styczinski | 395/182.04 |
| 6,008,805 A * | 12/1999 | Land et al. | 345/744 |
| 6,009,466 A | 12/1999 | Axberg et al. | 709/220 |
| 6,058,455 A * | 5/2000 | Islam et al. | 710/10 |
| 6,061,692 A * | 5/2000 | Thomas et al. | 707/10 |
| 6,076,142 A | 6/2000 | Corrington et al. | 711/114 |
| 6,098,119 A | 8/2000 | Surugucchi et al. | 710/10 |
| 6,128,730 A * | 10/2000 | Levine | 709/108 |
| 6,292,790 B1 * | 9/2001 | Krahn et al. | 700/79 |
| 2001/0008010 A1 * | 7/2001 | Sanada et al. | 711/152 |

FOREIGN PATENT DOCUMENTS

| | | |
|---|---|---|
| EP | 0 768 599 A1 | 4/1997 |
| EP | 0 706 113 A3 | 2/1999 |

* cited by examiner

*Primary Examiner*—Hong Kim
(74) *Attorney, Agent, or Firm*—R. Michael Ananian; Arthur J. Samodovitz

(57) ABSTRACT

A method, system and computer program for text-based controller configuration is disclosed.

Storage is divided into a reserved disk area and a customer data area. Each reserved disk area contains two copies of the configuration and a directory. The reserved disk area also contains an identifier/locator that identifies the configuration in use by computer system. The identifier/locator is stored in either the first block or last block of each disk. Configuration information is transferred between the disk and controller or between the controller and host computer in text form, i.e. strings, to avoid big-endian/little-endian problems that may exist between controllers made by different manufacturers. The text-based configuration information is expressed in strictly defined keywords and attributes associated with the keywords. The transmission of configuration in text rather than numerical format also eliminates the problems of atomic storage and structure member packing, as the controller and host computer utilize a parser-generator to convert the received text information into native data structures.

12 Claims, 5 Drawing Sheets

```
LunAffinity
    Volume Set  0  C0P0LUN  0  C0P1LUN  0  C1P1LUN  0  C1P1LUN  0
LunAffinityEnd
```

```
LunMapping
    VolumeSet  0  C0P0  01234567  C0P1  01234567  C1P1  0245  C1P1  1357
LunMappingEnd
```

```
IdentifierLocator
        RAID Controller Standard Configuration, Version 1.00
312         External Products, SX Family Config, v5.67      310
314         RdaSize     250000
316         DiskLocation chan 1 targ 2
318         ControllerIdentification    1 2
320         TopDirectoryLocation        3 2
            TopDirectoryLock            5 1
IdentifierLocatorEnd
```

FIG. 3

```
                          412
    ControllerIdentifiers
410         Controller 1  0000000000000000000      414
            Controller 2  0000000000000000000
ControllerIdentifierEnd
```

FIG. 4

```
510    TopDirectory
  512        PrimaryDirectoryLocation   1 2
  514        PrimaryDirectoryLock       3 1
  516        BackupDirectoryLocation    4 2
  518        BackupDirectoryLock        6 1
  520        FreeListlocation           7 1
             FreeListLock               8 2
       TopDirectoryEnd
```

FIG. 5

```
DeviceStatus
        VolumeSet       0 1
        VolumeSet       1 1
        VolumeSet       2 1
        InternalVolumeSet   0 1
        PhysicalDevice  Chan 0  Targ  0 1
        PhysicalDevice  Chan 0  Targ  1 1
        PhysicalDevice  Chan 0  Targ  2 1
        PhysicalDevice  Chan 0  Targ  3 1
        PhysicalDevice  Chan 0  Targ  4 1
        PhysicalDevice  Chan 0  Targ  5 1
        PhysicalDevice  Chan 0  Targ  6 1
        PhysicalDevice  Chan 0  Targ  7 1
DeviceStatusEnd
```

FIG. 12

```
Directory
        DiskConfiguration       1       9
        DiskStatus              10      2
        ControllerConfiguration 12      1
        ControllerFirmware      13      2048
        HtmlPages               2061    10240
DirectoryEnd
```

FIG. 7

```
VolumeSet  0  Raid  0  WriteCache  0
        InternalVolumeSet   0
                LogicalStartLBA  0
                Size  2500000
        InternalVolumeSet   End
        InternalVolumeSet   1
                LogicalStartLBA  0
                Size  2500000
        InternalVolumeSetEnd
VolumeSetEnd
InternalVolumeSet  0  Raid  5  WriteCache  1
        RedundancyGroup  1
                LogicalStartLBA  105500
                Size  500000
        RedundancyGroupEnd
InternalVolumeSetEnd
InternalVolumeSet  1  Raid  5  WriteCache  1
        RedundancyGroup  2
                LogicalStartLBA  20000
                Size  500000
        RedundancyGroupEnd
InternalVolumeSetEnd
```

FIG. 8

```
RedundancyGroup  1  Block  512
        StripeSize  8196
        NumDevs  6
        VirtualDeviceSize  599978763
        PhysicalDevices
                Device  Chan  1  Targ  2
                Device  Chan  2  Targ  3
                Device  Chan  3  Targ  4
                Device  Chan  4  Targ  5
                Device  Chan  5  Targ  6
                Device  Chan  3  Targ  3
        PhysicalDevicesEnd
        Sparing  1
RedundancyGroupEnd
```

FIG. 9

METHOD FOR STORAGE CONTROLLERS WITH DIFFERENT DATA FORMATS TO ACCESS COMMON STORAGE CONFIGURATION INFORMATION

FIELD OF THE INVENTION

The present invention relates broadly to computer storage devices. Specifically, the present invention relates to configuration of controllers of computer storage devices, and more specifically to a text-based configuration of controllers for storage systems including for redundant arrays of independent disk (RAID) systems.

BACKGROUND OF THE INVENTION

Controllers for redundant arrays of independent disks (RAID) are currently produced by numerous manufacturers without adherence to any particular configuration standard. The result is that a system requiring more than one RAID controllers may be limited to controllers made by only one manufacturer so that at least a common configuration standard can be used for the multiple controllers, which over time and for systems requiring a large number of RAID controller may become expensive and prevent the system from incorporating RAID controllers that are either less expensive or employ newer and more efficient technologies.

Several obstacles hinder the implementation of a configuration standard. Big-Endian/Little-Endian is a processor attribute that refers to the order in which multi-byte numeric entities are communicated and/or stored in memory. For example, Intel processors are Little-Endian while processors made by Sun, Motorola and other manufacturers are Big-Endian. Many processors have selectable Endianess so that they will work in any given situation. A 32-bit entity needs 4 bytes of memory and a 16-bit entity needs 2 bytes of memory. Big-Endian processors store these multi-byte entities so that the most significant byte is in the lowest addressed byte of the required memory locations with the other bytes stored in decreasing significance order in the remaining higher memory address locations.

The problem with Endianess with respect to disk controller configurations is that controllers can have processors with one Endianess and computers hosting the configuration software can have processors with the other Endianess. Neither processor by itself has direct knowledge of the other and how it handles Endianess so the software in one or both processors must convert to the Endianess of the other. Complexity increases as conventions become involved, and custom software must frequently be created for each different computer system based on the Endianess involved.

Another obstacle to the implementation of a configuration standard is that of atomic storage. Atomic storage is the atomic size problem that may exist in parts of the software that use the configuration data transferred as text and arises when fixed data structures are used. Each item in the data structure will have a fixed size. When text in the configuration is updated to a size that exceeds the data structure the entire data structure must generally be changed and all users of that structure must be updated with the new data structure. This typically means that the software must be recompiled and re-released.

A data structure must be changed in this manner whenever greater range is required of one of the entities. As products evolve they take on greater capabilities and it takes more space to represent those capabilities. An example of this problem is seen where a SCSI disk controller that today supports 16 drives on 10 channels yielding a total of 160 drives. The number "160" easily fits in a byte. Upgrading the disk controller to a fibre channel permits the controller to support 125 drives on each of the 10 channels. That makes the number of possible drives equal to 1250 which will no longer fit in the original byte location, as an 8-bit byte can count only 255 items. Thus, the data structure must be changed to expand that byte to something larger. One attempted solution to this problem is to use the largest numeric entities available to hold every item, even when one byte will do. This solution is inefficient when there may be a large number of such items to transfer.

Data structure packing is yet another problem. Data structure packing refers to the way in which the members of a data structure are aligned and how much space, if any, is left between the members. The packing problem is encountered when passing data structures between computers that use different operating systems and/or compilers. Different compilers may pack data structures differently because they use different criteria to determine how to pack their structures. Some compilers will align each data structure member on a 32-bit boundary. Some use other boundaries. When this happens the software using the data structure must use the same packing and therefore have the same gap between structure members. Often this is simply not possible. In most cases the data structures will be hand packed by laboriously adding appropriately sized dummy members in the gaps to simulate compiler packing and the members must still be aligned properly. Once the data structures are hand packed, the programs are then compiled using special flags to turn off any packing operations that would normally be performed. This results in a situation similar to the atomic storage problem, and upgrades to the programs require re-packing and re-compiling.

Configurations of any size are typically stored on disk in a Reserved Disk Area (RDA). Other items such as firmware code images and device error logs may also be stored in the RDA. Very small configurations may also be stored in non-volatile RAM type devices directly on the controller cards. These non-volatile RAM type devices are usually much more expensive than disk, perhaps dollars per megabyte rather than pennies per megabyte; therefore usage is limited.

A problem with configuration storage arises if fixed data structures are used. A firmware upgrade is often required that implements new configuration features, for example, changes the data structure members in some way, and may have to use special code to convert the old structures to the new structures. The converted or "new" structures may require some means of indicating that they have been converted. Often a flag of some sort must be incorporated into the new configuration. Converting the old configuration data to the new configuration's format is a risky operation if only one copy of the configuration is maintained in the RDA. This is because there is a point when the old data structures are effectively eliminated from the RDA and the new data structures have not yet been written to the RDA. A power failure in mid-write will leave the RDA with a configuration that is only partially updated.

Another problem associated with storage is portability. A customer may want to move all or some of the disks from one controller system to another. If both controller processors are the same then the disks are portable and the configuration on the moved disks may be used without modification. If they are not the same, perhaps one is Big-Endian and the other is Little-Endian, then the problems described above will surface and there will be a severe risk of data loss due to configuration problems.

The process of creating configurations also makes implementation of a configuration standard difficult. Configurations are usually created using special purpose software. The software usually includes some form of graphical user interface (GUI). The GUI is a maintenance problem in itself. Anytime a new feature is added components in the GUI will have to change. Examples are fields that must be made larger, display boxes that require scrolling and new dialogs that are needed. Sometimes a new feature will mean the text configuration has to change to incorporate the new feature; usually this will be a new section consisting of all new keywords.

One of the most elementary problems with a configuration standard is the large number of vendor unique (VU) commands required, or in any event used by, the various controllers. Each manufacturer incorporates their own set of special commands into their controllers in order to support various functions. Because of certain restrictions, such as allowed maximum data size, the number of VU commands can be unwieldy.

Therefore there remains a need for a configuration standard that overcomes the problems discussed above to allow a variety of computer systems and RAID controllers to be used together to more effectively utilize computer resources.

SUMMARY OF THE INVENTION

The present invention provides a computer system, a controller, method and computer program for implementing a controller configuration that overcomes the problems discussed above.

In an embodiment of the present invention, ASCII text, such as for example ASCII English text (7 bit) or other text or symbol based string is used to create the configuration, and any text or symbol editor can be used to make changes. Configuration information is described in strictly defined keywords and attributes. The configuration may be stored on disk or other suitable storage media and transferred to and from the controller in symbol strings, for example, in ASCII text composed of strings. For simplicity we refer to all such symbol or symbol based strings as text. The text may be organized into functional blocks delineated by strings.

The configuration of the present invention is portable across virtually all controller platforms. Using text to transfer configuration information avoids problems such as Big-Endian/Little-Endian and data structure member packing. Parser-generators operated by the controller and host computer allow the controller and host computer to receive the configuration information in text form and convert it into native data structures. The configuration of the present invention may be stored on disk in multiple copies as well as in nonvolatile memory of the controller in a strictly controlled manner that allows easy access. Write locks are advantageously used to protect against power failures during updates to the configuration.

BRIEF DESCRIPTION OF THE DRAWINGS

The present invention will be explained in the following detailed description and accompanying drawings, in which:

FIG. 3 illustrates the identifier/locator portion of the controller configuration;

FIG. 4 illustrates the controller identifier portion of the configuration;

FIG. 5 illustrates the top directory portion of the configuration;

FIG. 7 illustrates a directory portion of the configuration;

FIG. 8 illustrates the external and internal volume set portions of the configuration;

FIG. 9 illustrates a redundancy group portion of the configuration as utilized in the volume sets;

FIG. 12 illustrates the device status portion of the configuration.

DETAILED DESCRIPTION OF EMBODIMENTS OF THE INVENTION

Figures 1, 10, 11:
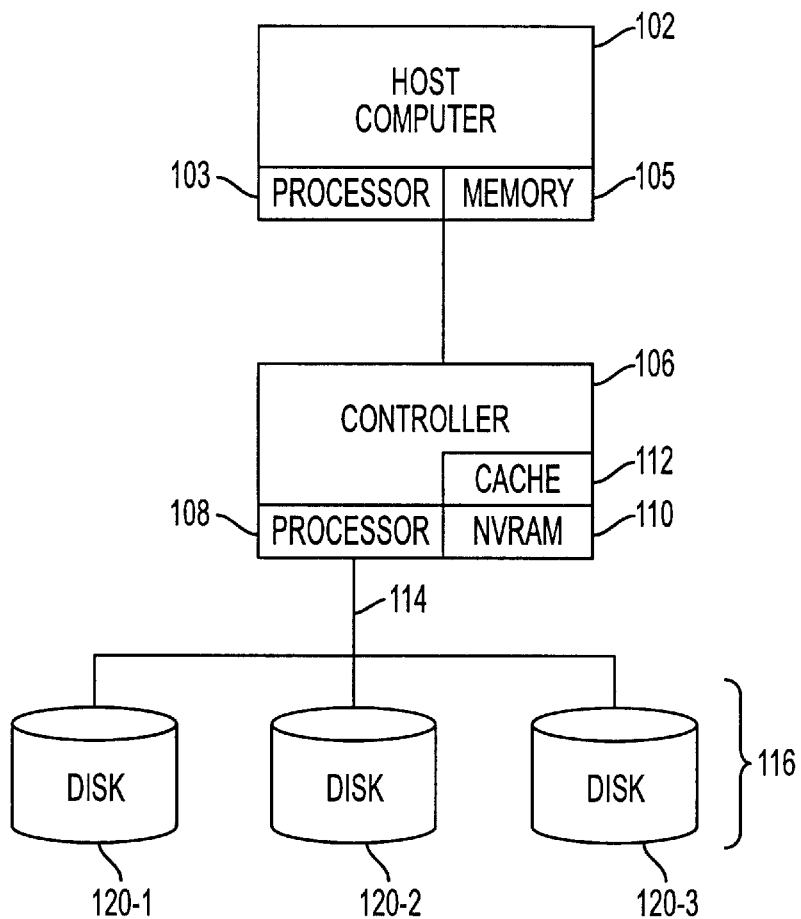
FIG. 1 illustrates, in block diagram form, the various components in an exemplary computer system utilizing a controller and array of storage disks.
FIG. 10 illustrates the logical unit portion of the configuration.
FIG. 11 illustrates the logical unit mapping portion of the controller configuration.

FIG. 1 shows a block diagram of a typical RAID system 100 (RAID is an acronym for "Redundant Array of Independent Disks"). The RAID system 100 is exemplary of a data storage system which may generally be used in conjunction with the storage system controller, so that the invention is not limited to RAID systems only, nor to magnetic disk based storage systems. A host computer 102, having a processor 103 and a memory 105 is connected to a respective RAID controller 106.

The RAID controller 106 coordinates reading and writing requests from a respective host 102 directed to a shared set 116 of storage devices such as magnetic disk storage devices 120-1, 120-2, 120-3 to which the RAID controller 106 is connected. For example, the connection may be achieved via a device such as a backend Fibre Channel, SCSI, or other disk bus 114. The controller 106 includes processor 108 as well as non-volatile memory (NVRAM) 110. Controller 106 forwards host data traffic to non-volatile storage media such as magnetic disks 120-1, 120-2, and 120-3. While three disks are shown connected to controller 106, it is to be understood that more or fewer disks may be connected in various embodiments. Other storage devices such as optical disks, magneto-optical disks, solid-state storage elements, or other storage devices or systems may be used. Controller 106 may include a cache 112 to improve the rate at which data can be written to or be retrieved from the storage media 120.

An embodiment of the present invention uses a text-based configuration produced from ASCII English text, available and known world wide, composed of keywords and parameters. Although characteristics of a particular embodiment are now described, it will be appreciated by workers having ordinary skill in the art in light of the description provided here, that variations and substitutions may be made without departing from the scope or spirit of the invention. In some instances, such variations or substitutions may somewhat restrict the universality or produce a different standard than that described for preferred embodiments. Thus it will be appreciated that the invention provides alternative choices of a standard configuration and configuration tools and procedures.

In one embodiment, seven-bit (7-bit) ASCII is preferably used to avoid the diacritical marks found in 8-bit ASCII variants. Preferably, keywords are strictly defined and known to the parser-generator. Less strict keyword definitions and sets may be implemented but with some potential sacrifice in universality. Parameters are specific to the keywords in form and content, and describe attributes such as size, location and organization. Lines are limited to 80 characters. If the parameters exceed 80 characters, then an additional keyword with parameters is used. Keywords are context sensitive. They can be reused in different blocks and to have different meanings. Keywords are desirably chosen for uniqueness first and readability second. White space formatting is allowed on input by the user but may be replaced or reduced on output. Blank lines are ignored on input and lost on output. An optional feature is the controller production of an example form with parameter range values. This works in a manner analogous to mode sense default/changeable pages. As already stated, these rules are preferred as they provide a high degree of standardization and universality; however, other choices may be made (such as for example, not allowing white space formatting on input) without departing from the invention.

Using text has several advantages to other configuration methods. It may be read using any text viewer, and changed with any text editor. Using a text editor avoids the graphical user interface (GUI) problems discussed above. Text eliminates Big-Endian/Little-Endian data presentation problems because numerical representations are not passed between processors. Atomic storage size problems (signed/unsigned char/short/long) and structure member packing problems are eliminated because no fixed data structures are required. The portability problem is solved by storing the configuration on disk as text. Being interpreted, the in-memory representation of the controller configuration is controller specific. Currently existing controllers typically use a controller specific representation at all times and locations. Simple SCSI utilities, such as a read buffer and write buffer, can be used to access the configuration in the controller. Special vendor unique commands are not required, but may still be used.

Figure 2:
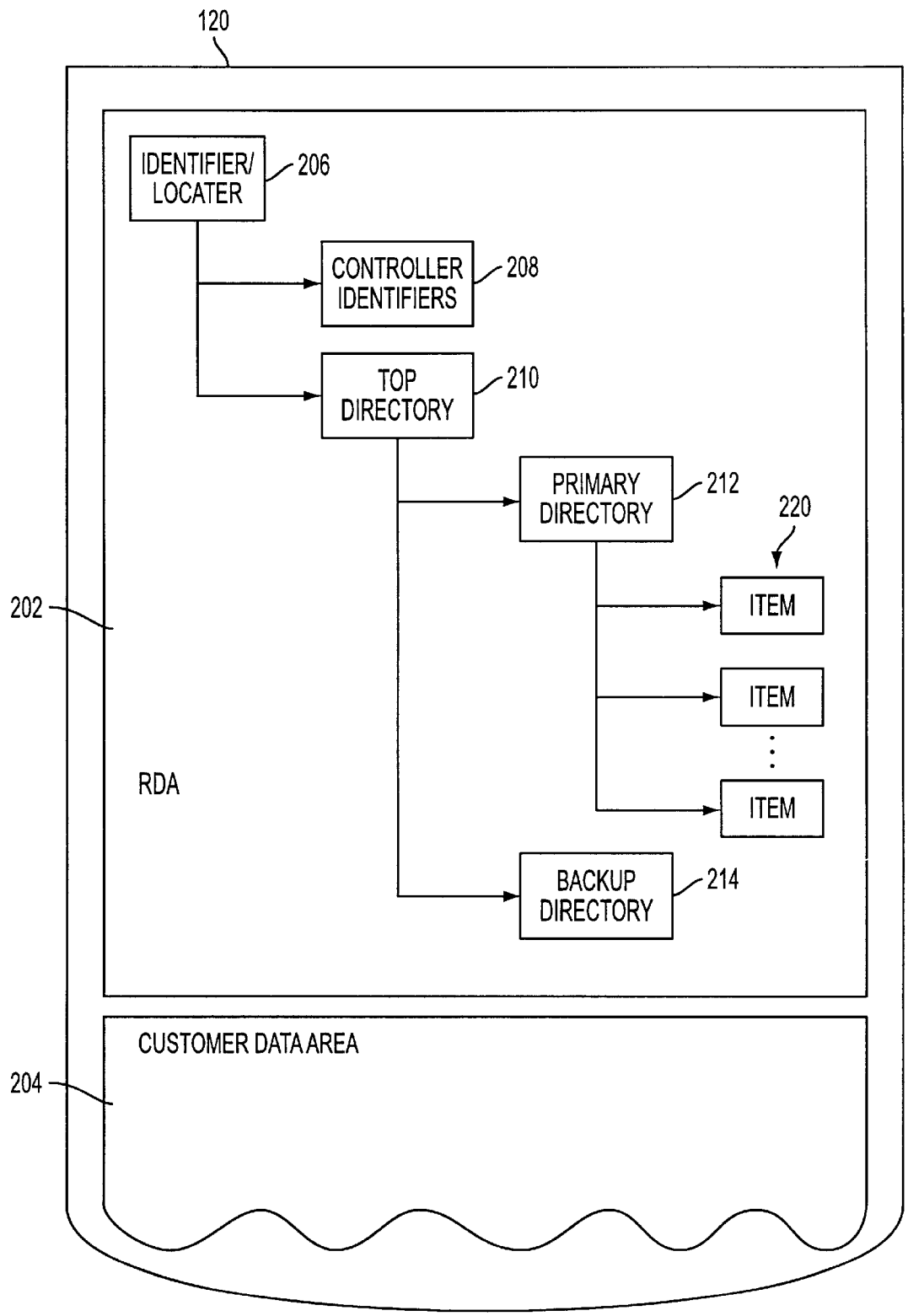
FIG. 2 illustrates the organization of an exemplary data and controller configuration.

Directing attention to FIG. 2, storage on disks (or other storage media) 120 is divided into two regions, the reserved disk area (RDA) 202 and the customer data area 204. The RDA is a contiguous region on disk not included in any other on-disk structure. The RDA size is determined by the individual vendor when an array of disks is first created. (When the storage medium is other than disk, a reserved area serving the same or analogous function to the reserved area on a disk is provided.) At a minimum, the RDA should be large enough for the directory and two copies of the disk configuration. An RDA size of 1 MB is the recommended minimum; however, it is only necessary to be large enough to store the directory and disk configuration information.

The RDA is further divided into an identifier/locator 206, controller identifiers 208, top directory 210, primary directory 212, backup directory 214 and the various stored items 220. The identifier/locator 206 and therefore the RDA 202 is placed in a known position on disk 120. The identifier/locator 206 identifies the disk 120 to which the configuration was written and locates the configuration in use as well as the top directory 210. The top directory 210 in turn points to a primary directory 212 and a backup directory 214 which points to stored items. The identifier/locator 206 is contained in a singleblock of the RDA. The identifier/locator 206 identifies the vendor and version of the configuration in use and indicates the size of the RDA 202.

In a preferred embodiment of the present invention, the identifier/locator 206 is stored in either the first or last block on each disk. Therefore it is stored in the first or last block of the RDA. Each controller may typically have a preferred location for the identifier/locator 206. The controller looks first in the vendor-preferred location for the identifier/locator 206 to determine the configuration of the storage device. If it is not found there, the controller will examine the other possible location. Once the location is found, that location is used. Doing otherwise would require moving customer data. The purpose of the two locations is to allow arrays of physical disks to be imported into any controller system from any other controller system and to allow for the upgrade of non-configuration products.

RDA's are either first on the disk or last, depending on the manufacturer. Allowing the use of either location allows for migration to the configuration of the present invention from nonstandard configuration schemes.

The contents of an exemplary identifier/locator 206 are shown in FIG. 3. The "RAID Controller . . . " string 207 is first after the Literal Keyword Identifier Locator in the identifier/locator 206 and serves to inform the controller of the format of the directory. There may be multiple versions of the directory format in use. Controllers should desirably be able to interpret older directory formats. Before use, the directory should be fully parsed to detect possible format problems. If any problem is discovered with the format, then the other directory location should be tried. Only one of the two directory locations will be used.

The Vendor string 310 allows the controller to determine the ownership of the directory. In a system using multiple controllers, configurations for different controllers may be imported from the various controllers. Imports are detected in a subsequent phase of start up after a known configuration has been retrieved from known disks. The imported configuration is then interpreted, incorporated, placed into service and updated to all required disks. Part of this update will be to re-set the vendor string 310 in the identifier/locator 206. The vendor string 310 may contain more than just the vendor name. It may also indicate the type of the current controller from the vendor. The RDA size string 312 indicates the number of blocks reserved. Disk Location 314 indicates the disk to which the configuration was written. The controller identification string 316 indicates the location and size of the controller identification area. Top Directory Location 318 indicates the location and size of the Top Directory. Top Directory Lock 320 indicates the location and size of the Top Directory Lock.

The controller identifier is a contiguous sequence of blocks containing a textual description of the controllers that "own" the configuration. It is used during the discovery process to fully establish the origin of the configuration as the Vendor Information may sometimes not be enough.

It is preferable that the size of the controller identifier be chosen with some room for growth. In an embodiment of the present invention, space for 32 controllers is allocated. The controller identifier is usually only updated at import time and controller replacement time. For this reason a lock is not required.

With reference to FIG. 4, the controller identifier begins with the line "ControllerIdentifiers" and ends with the line "ControllerIdentifiersEnd." The lines in between include Controller 410, a string that describes the device. Controller number 412 indicates the number of controllers supported. Controller world wide unique address 414 is a media access control (MAC) address. The MAC address is 48 bits. If a controller system does not use MAC addresses, then a number unique for that vendor/controller instance is assigned.

A directory is a contiguous sequence of blocks containing a textual description of the various stored Items. In the preferred embodiment of the present invention directories such as primary, backup, and free list are included. The directory itself may be more than one block in size.

With reference to FIG. 5, an exemplary Top Directory is illustrated. The Top Directory is a contiguous sequence of blocks containing a textual description of the various sub-directories. The top directory itself may be more than one block in size. The purpose of the top directory is to allow for expansion and repositioning of the sub-directories. Each top directory begins with the line "TopDirectory" and ends with the line "TopDirectoryEnd." The Primary directory location 510 points to the actual directory. The primary directory lock 512 points to the directory lock block. This lock block serves two functions. While updating, it is a lock-out signal to other bus residents that may also need to update anything in that directory. This is similar to using SCSI reserve-release in a multiple controller system to prevent multiple simultaneous updates. A backup directory location 514 and backup directory lock 516 are also included to restore the directory in the event the primary directory location 510 or primary directory lock 512 become corrupted.

The final items in the top directory are the free list location 518 and free list lock 520. The free list indicates available areas of storage on a disk. The free list location and lock are similar to the directory items discussed above. The free list is not strictly required as it can be regenerated from the other data. However, to save processing resources it is preferable to maintain the list rather than regenerate it with every update.

Two copies of the configuration are stored on each disk in the RDA because the power can fail when writing the RDA. This will result in a partial update. Protective devices such as checksums serve only to detect corruption and may not work in all cases. A write-lock is desirably used along with the two copies of the configuration. The write-lock is "set" when the configuration write is started and "cleared" when the write is completed. If the controller processor, at power-on time, discovers a write-lock "set" it knows the power failed during the write of whatever the write-lock protects. Corrective action must then be taken. The lock indicates that an update was interrupted and that the locked item must be recovered. The lock block, when locked, contains the string "Stored Item X locked by Y" where X is the Stored Item being updated (e.g. DiskConfiguration) and Y is the updating controller'ID. The controller ID must be unique in the current system and is similar to a slot number or MAC address. The lock block, when unlocked, contains the string "unlocked." Lock writes are performed with SCSI Force Unit Access true and disconnecting I/O is assumed.

Figure 6:
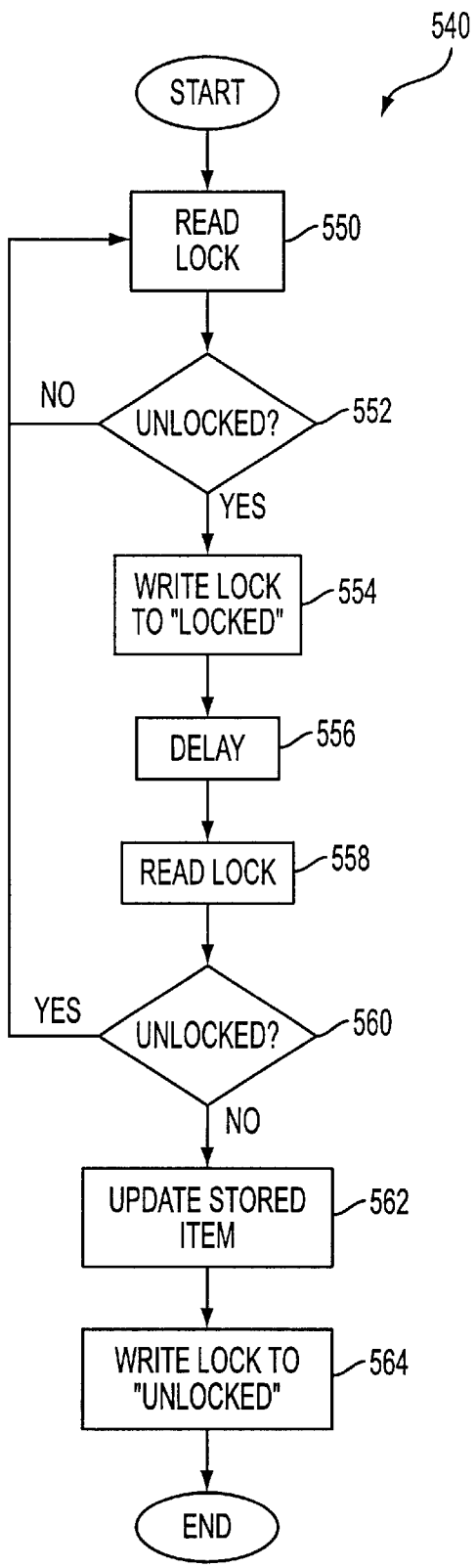
FIG. 6 illustrates, in flow diagram form, the logical sequence of steps to perform a lock procedure for writing to the configuration.

An exemplary embodiment of the lock procedure 540 performed is now described with reference to FIG. 6. Beginning at step 550, the processor in the controller reads the status or value of the lock. If unlocked (decision step 552), control proceeds to step 554 where the controller processor changes the value in the lock to show it is locked. However, if the lock is shown to be locked, step 550 is repeated. Continuing to step 556, the processor executes a delay for a predetermined period. Continuing to step 558 after the delay, the lock is read again. If the lock is not locked (decision step 560), control once again returns to step 550. Otherwise, control proceeds to step 562 where the Stored Item is updated. The value of the lock is then changed to indicate that it is unlocked at step 564. The locks must be unlocked when transporting arrays.

Sizes of the directory locator items should desirably be chosen with some room for growth, especially the free list. Updates of the directory locations 514, 518 should desirably be minimized as it is an important part of the system and does not require a lock. The directory locator should only need updating when an array of disks is created.

Directing attention to FIG. 7, which illustrates an exemplary embodiment of the directory portion of the configuration, each directory begins with the line "Directory" and ends with the line "DirectoryEnd." Information is organized in columns of item name, item starting block, and item size. The item name describes the item. The item starting block is the pointer (block address) to where the item is stored. The item size gives the size of the item in blocks. The controller is expected to use the disk'current block size. If byte counts are needed, then the disk must normally be queried with Read Capacity or other means for the block size and appropriate math or computational functions performed.

Directories on each physical disk may be different. This is because disks 120 may have been physically imported to the controller and may have had different items updated at different times. Directory updates are nominally handled on a per disk basis.

FIG. 8 illustrates the organization of an exemplary disk configuration. The disk configuration describes everything needed to configure physical disks into host accessible logical units (LUNs). The disk configuration shown in FIG. 8 is for a controller configuration with one spanned RAID 5 LUN, such as for example for a Mylex SX controller (available from the Mylex Corporation in Fremont, Calif.). There are two types of Volume Sets, external and internal. External Volume Sets are addressable by the host for customer data traffic. Internal Volume Sets are not addressable by the host; they are subordinate to External Volume Sets and provide the External Volume Sets with the capability of connecting multiple RAID controllers. The term "volume set" is synonymous with "system drive" and "logical device." Volume Sets "point" to either Internal Volume Sets or to a single redundancy group.

A redundancy group is a collection of physical devices and parameters common to those devices. The term "redundancy group" is synonymous with "drive group" and "disk set." When a physical device fails it is the redundancy group that must have a spare device available. All the consumers of the redundancy group that should be notified of the failure. Volume Sets are not split across redundancy groups. A special Volume Set, called the Spare Pool, consisting of one redundancy group that contains all unused physical devices, is suggested as a means of managing spare disks. The start and size numbers are in blocks.

An exemplary redundancy group portion of the configuration is illustrated in FIG. 9 which includes the stripe size (StripeSize), number of devices (NumDevs), virtual device size (VirtualDeviceSize), a list of physical devices (PhysicalDevices) including their device channel (Chan) and Target (Targ), and the sparing (Sparing).

All physical devices in a redundancy group should desirably have the same block size, stripe size and other parameters relating to data access. The space within the redundancy group is parceled out in the Volume Sets that are attached to it.

Physical Devices are the actual storage media of the RAID controller. Vendor Unique Sections contain descriptions of configuration items that are specific to a particular controller. Information in this category is not imbedded into the above sections because they are not portable to all controller platforms. LUN Affinity is a simple means of forming and controlling access paths in a multiple controller RAID controller system. It allows a Volume Set to be accessed by a single LUN on each host port. An example of a LUN Affinity is illustrated in FIG. 10.

With reference to FIG. 11, LUN mapping is a more complex means of establishing and controlling access paths in a multiple controller RAID controller system. It allows a Volume Set to be accessed by multiple LUNs on each host port. For portability, Redundancy Groups must be imported as whole units consisting of Volume Sets, Internal Volume Sets, Redundancy Groups and Physical Devices. If a Volume Set references more than one Redundancy Group, then all referenced groups must be imported. The reason for this is to reduce complexity. While it is certainly possible to import a Volume Set with some parts missing, it is not deemed a necessary or supported action.

The controller configuration has its primary storage in NVRAM 110 on the controller 106. Storage on disk is a backup in case NVRAM fails or the controller fails and is replaced. The MAC address will be used by a replacement controller to identify the on-disk copy of the controller configuration. When a controller powers up and fails to find its MAC address in the configuration it knows it is a replacement and should adopt the controller configuration from disk.

With reference to FIG. 12, device status describes volume set status, internal volume set status, and physical device status. Device status may be separate from disk configuration. This is because the two are unrelated and unconcerned with each other. The only time device status has effect on disk configuration is when a spare replaces a failed disk. Keeping these separate allows for quicker, more efficient updates to disk.

The volume set state is retained here because the device may have been commanded to a certain state. If not commanded to a state, then the volume set status is derivable from its component devices.

In the preferred embodiment of the present invention, controller firmware may be stored as binary on disk. Two copies are stored with a special lock to allow the boot program to find a valid copy. The two copies include one copy from the most recent download and one copy from the next most recent download, which is which is kept in the controller firmware lock (ControllerFirmwareLock) block. The two copies are provided for situations where the flash is only a boot and functional firmware is only on disk.

The text-based data representation of the present invention carries multi-byte entities as strings of numerals, e.g., "123", thus allowing easy conversion of the string to a number, 123, without regard for how it resides in memory. By using a text-based configuration, when either the controller processor or the configuration software processor needs to send data to the other end, it converts numeric entities from its memory format to text and sends the text. Upon receipt the receiving end will then convert the text representations of numeric entities back to its native memory format for numbers.

Parser-generators are program modules used by the controller processor 108 and host processor 103. The parser-generator reads the text configuration and converts or interprets it, using keywords and keyword arguments, into the respective processor's native memory structures. Fixed structure configuration has no keywords so they do not utilize this technique; they rely on both ends being synchronized in all respects. The parser-generator is utilized anytime a configuration is to be processed. The parser-generator converts the configuration from text to fixed structures. The source of the text configuration can be either a disk's RDA or software running on a different processor. Parser-generators are known to those skilled in the art and need not be discussed in detail herein.

The possibility of a power failure in mid-update is the reason that two copies of the configuration are specified to be stored in the RDA of each disk attached to each controller, otherwise one copy would suffice. When power returns both copies can be examined for correctness, using various known techniques, and the proper one selected for use.

While the present invention has been described in detail with respect to specific embodiments, those skilled in the art understand that many modifications to the invention may be made without departing from the spirit thereof.

What is claimed is:

1. A method of operating a computer system, said method comprising the steps of:
   coupling a first storage controller to a disk drive, said first storage controller utilizing a first format to store data and also supporting ASCII text format;
   communicating configuration information as a string of ASCII text from said first storage controller to said disk drive;
   storing said configuration information in said disk drive as said ASCII text;
   coupling a second storage controller to said disk drive, said second storage controller utilizing a second format to store data and also supporting ASCII text format, said second format being incompatible with said first format;
   said second storage controller fetching said configuration information from said disk drive as a string of ASCII text and then displaying said configuration information based on said ASCII text without prior conversion to said second format; and
   said second storage controller subsequently converting said configuration information into said second format for use within said second storage controller.

2. A method as set forth in claim 1 wherein said second storage controller is coupled to said disk drive after said first storage controller is coupled to said disk drive.

3. A method as set forth in claim 1 wherein said configuration information comprises RAID level information.

4. A method of operating a computer system, said method comprising the steps of:
   coupling a first storage controller to a disk drive, said first storage controller having a processor with Big-Endian attribute;
   communicating configuration information as a string of ASCII text from said first storage controller to said disk drive;
   storing said configuration information in said disk drive as said ASCII text;
   coupling a second storage controller to said disk drive, said second storage controller having a processor with a Little-Endian attribute;
   said second storage controller fetching said configuration information from said disk drive as a string of ASCII text and then displaying said configuration information based on said ASCII text; and
   said second storage controller subsequently converting said configuration information into said Little-Endian format.

5. A method as set forth in claim 4 wherein said second storage controller is coupled to said disk drive after said first storage controller is coupled to said disk drive.

6. A method as set forth in claim 4 wherein said configuration information comprises RAID level information.

7. A method of operating a computer system, said method comprising the steps of:

coupling a first storage controller to a disk drive, said first storage controller having a processor with Little-Endian attribute;

communicating configuration information as a string of ASCII text from said first storage controller to said disk drive;

storing said configuration information in said disk drive as said ASCII text;

coupling a second storage controller to said disk drive, said second storage controller having a processor with a Big-Endian attribute;

said second storage controller fetching said configuration information from said disk drive as a string of ASCII text and then displaying said configuration information based on said ASCII text; and said second storage controller subsequently converting said configuration information into said Big-Endian format.

8. A method as set forth in claim 7 wherein said second storage controller is coupled to said disk drive after said first storage controller is coupled to said disk drive.

9. A method as set forth in claim 7 wherein said configuration information comprises RAID level information.

10. A method of operating a computer system, said method comprising the steps of:

coupling a first storage controller to a disk drive, said first storage controller utilizing a first atomic size data structure to store data and also supporting ASCII text string format;

communicating configuration information as a string of ASCII text from said first storage controller to said disk drive;

storing said configuration information in said disk drive as said ASCII text;

coupling a second storage controller to said disk drive, said second storage controller utilizing a second atomic size data structure to store data and also supporting ASCII text format, said second atomic size data structure being incompatible with said first atomic size data structure; and said second storage controller fetching said configuration information from said disk drive as a string of ASCII text and then displaying said configuration information based on said ASCII text.

11. A method as set forth in claim 10 wherein said second storage controller is coupled to said disk drive after said first storage controller is coupled to said disk drive.

12. A method as set forth in claim 10 wherein said configuration information comprises RAID level information.

* * * * *